(12) United States Patent
Brooks

(10) Patent No.: US 6,673,175 B2
(45) Date of Patent: Jan. 6, 2004

(54) METHOD AND APPARATUS FOR PERFORMING MULTIPLE WELDING OPERATIONS WITHIN ONE WELD FIXTURE ASSEMBLY

(75) Inventor: Michael Brooks, Windsor (CA)

(73) Assignee: Siemens VDO Automotive, Inc., Chatham (CA)

( * ) Notice: Subject to any disclaimer, the term of this patent is extended or adjusted under 35 U.S.C. 154(b) by 29 days.

(21) Appl. No.: 10/156,550

(22) Filed: May 28, 2002

(65) Prior Publication Data
US 2002/0185208 A1 Dec. 12, 2002

Related U.S. Application Data
(60) Provisional application No. 60/296,658, filed on Jun. 7, 2001.

(51) Int. Cl.[7] ............................................... B29C 65/06
(52) U.S. Cl. ...................... 156/64; 156/73.5; 156/580
(58) Field of Search .................. 156/64, 73.5, 362, 156/580, 580.2, 583.1

(56) References Cited

U.S. PATENT DOCUMENTS 5,902,657 A * 5/1999 Hanson et al. ........... 428/36.92
6,103,035 A * 8/2000 Hanson et al. ............. 156/73.5

FOREIGN PATENT DOCUMENTS

| DE | 199 55 494 A1 | 5/2001 |
| FR | 2393666 A | 1/1979 |
| JP | 53004749 A | 1/1978 |
| JP | 60133990 A | 7/1985 |
| JP | 08108478 A | 4/1996 |

OTHER PUBLICATIONS

International Search Report, dated Oct. 11, 2002.

* cited by examiner

Primary Examiner—James Sells

(57) ABSTRACT

A vibration weld fixture assembly provides a three-piece component joined together with two separate welding operations. The vibration weld fixture assembly includes fixed upper and lower tools that support first and second component pieces, respectively. A center tool, movable relative to the upper and lower tools, moves a third component piece into engagement with one of the first or second component pieces for a first vibration weld operation. The center tool then moves the third component piece into engagement with the other of the first or second component pieces for a second vibration weld operation. A linear actuator assembly moves the center tool back and forth between the upper and lower tools.

20 Claims, 2 Drawing Sheets

METHOD AND APPARATUS FOR PERFORMING MULTIPLE WELDING OPERATIONS WITHIN ONE WELD FIXTURE ASSEMBLY

CROSS-REFERENCE TO RELATED APPLICATIONS

The application claims priority to U.S. Provisional Application No. 60/296,658, which was filed on Jun. 7, 2001.

BACKGROUND OF THE INVENTION

This invention relates to a method and apparatus for vibration welding at least three (3) separate component pieces within one (1) vibration weld fixture assembly.

Traditionally, a vibration weld fixture assembly includes a fixed upper tool for holding a first part and a fixed lower tool for holding a second part. The upper and lower tools clamp opposing faces of the first and second parts together for a single welding operation. During this welding operation a weld machine upper platen applies a sideways oscillation to the upper tool to generate the necessary friction between the first and second parts to provide the desired weld, forming a first component assembly.

If a third part is subsequently to be welded to the first component assembly including the first and second parts, the first component assembly is removed from the first vibration weld fixture assembly and then placed in a second vibration weld fixture assembly. The second vibration weld fixture assembly also includes upper and lower tools, which clamp a weld face on the third part to a weld face on the first component assembly for a second welding operation. The weld machine upper platen applies a sideways oscillation to the upper tool to generate the necessary friction between the third part and the first component assembly to provide a second weld, resulting in the formation of the final assembly of three pieces. Thus, in order to weld three (3) separate parts together with two welds, two (2) separate weld machines and two (2) separate weld fixture assemblies are required, which is expensive. Further the necessity of moving parts between the different weld fixture assemblies increases assembly time and cost.

Thus, it is desirable, to provide a method and apparatus for performing multiple welding operations for at least three parts within a single weld fixture assembly to reduce cost and assembly time, as well as overcoming the other above mentioned deficiencies with the prior art.

SUMMARY OF THE INVENTION

A vibration weld fixture assembly provides the formation of a multiple piece component in a single weld fixture assembly. A movable tool portion positions the separate component pieces relative to one another so that the pieces can be joined together by consecutive welding operations.

Preferably, the vibration weld fixture assembly includes fixed upper and lower tools that support first and second component pieces, respectively. A center tool, movable relative to the upper and lower tools, moves a third component piece into engagement with one of the first or second component pieces for a first vibration weld operation. The center tool then moves the third component piece into engagement with the other of the first or second component pieces for a second vibration weld operation.

In a preferred embodiment, an actuator assembly moves the center tool back and forth between the upper and lower tools. The actuator assembly includes a first linear actuator mounted to one of the upper or lower tools and a second linear actuator mounted to the other of the upper of lower tools. The first and second linear actuators selectively engage an adaptor mounted to one end of the center tool to move the center tool to a desired position between the upper and lower tools.

Preferably, a controller generates a control signal that is sent to the actuator assembly. The control signal positions the center tool at the desired location and determines clamp pressures between the first, second, and/or third component pieces for the vibration welding operations based on predetermined characteristics. For example, the controller varies clamp pressures between the component pieces based on component weight, tool weight, and weld area.

The method of vibration welding a three-piece component within a single vibration weld fixture assembly having an upper tool, a lower tool, and a center tool positioned between the upper and lower tools includes the following steps. A first component piece is loaded into the lower tool, a second component piece is loaded into the upper tool, a third component piece is moved into engagement with one of the first or second component pieces via the middle tool, and a first vibration weld is performed. Subsequent steps include moving the third component piece into engagement with the other of the first or second component pieces via the middle tool and performing a second vibration weld.

The subject apparatus and method provides single vibration weld fixture assembly that is capable of forming a multiple piece component with multiple welding operations. These and other features of the present invention can be best understood from the following specifications and drawings, the following of which is a brief description.

DETAILED DESCRIPTION OF A PREFERRED EMBODIMENT

Figure 1:
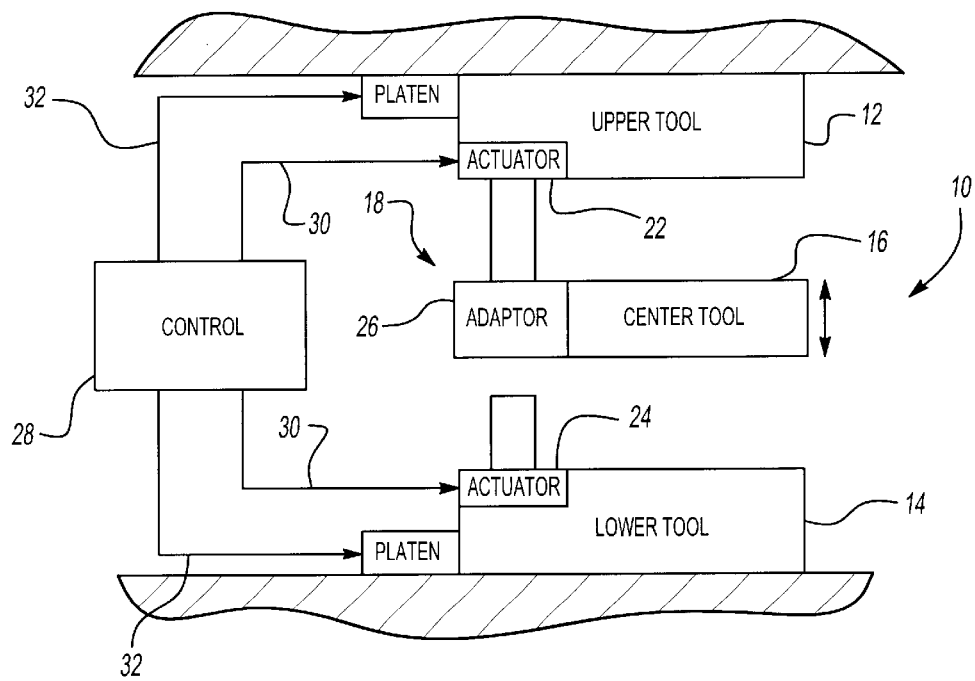
FIG. 1 is a schematic view of a control for a vibration weld fixture assembly incorporating the subject invention.

As shown in FIG. 1, a vibration weld fixture assembly 10 includes a fixed upper tool 12, a fixed lower tool 14, and a movable center tool 16 positioned between the upper 12 and lower tools 14. An actuator assembly, shown generally at 18, moves the center tool 16 back and forth between the upper 12 and lower 14 tools.

Preferably, the actuator assembly 18 includes a first actuator 22 mounted to the upper tool 12 and a second actuator 24 mounted to the lower tool 14. The actuators 22, 24 selectively engage an adaptor 26 mounted to one end of the center tool. A controller 28 generates control signals 30, which are sent to the actuators 22, 24 to move the center tool 16 to a desired weld position. Once the center tool 16 is in the desired position a control signal 32 is sent to a platen to perform the vibration weld operation, as is known in the art. The operation of vibration welding is well known in the art and thus will not be discussed in detail.

Figure 2:
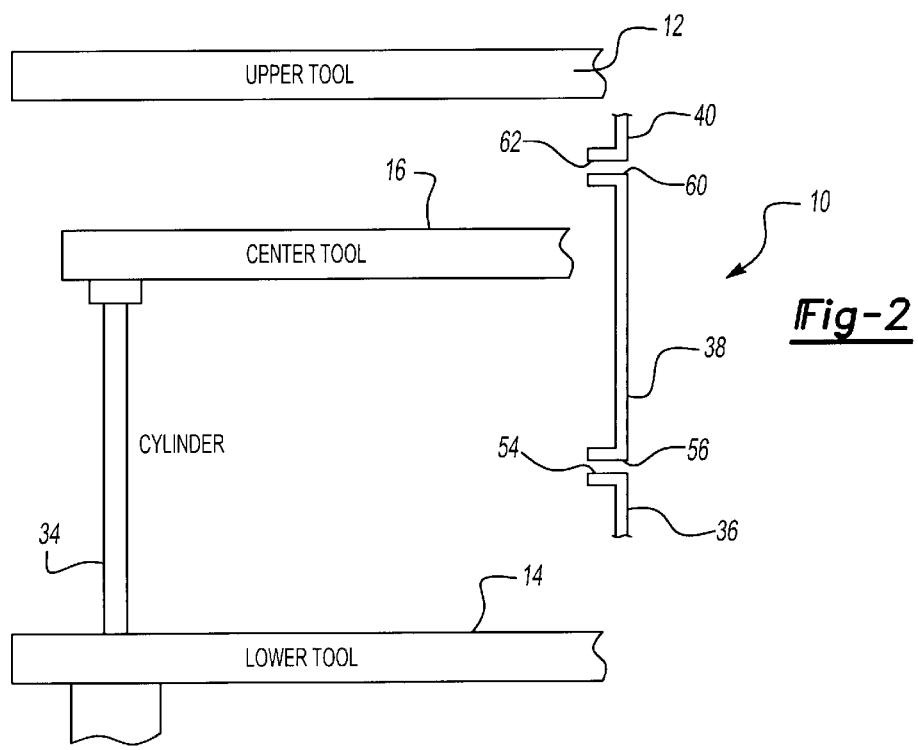
FIG. 2 shows a vibration weld fixture assembly incorporating the subject invention at a position prior to the loading of component pieces.

As shown in FIG. 2, at least one air operated cylinder 34, mounted to the lower tool 14, raises the center tool 16 to a level that allows a machine operator to load lower 36 and middle 38 component pieces into the lower tool 14. The upper component piece 40 is loaded into the upper tool 12 at this time too.

Figure 3:
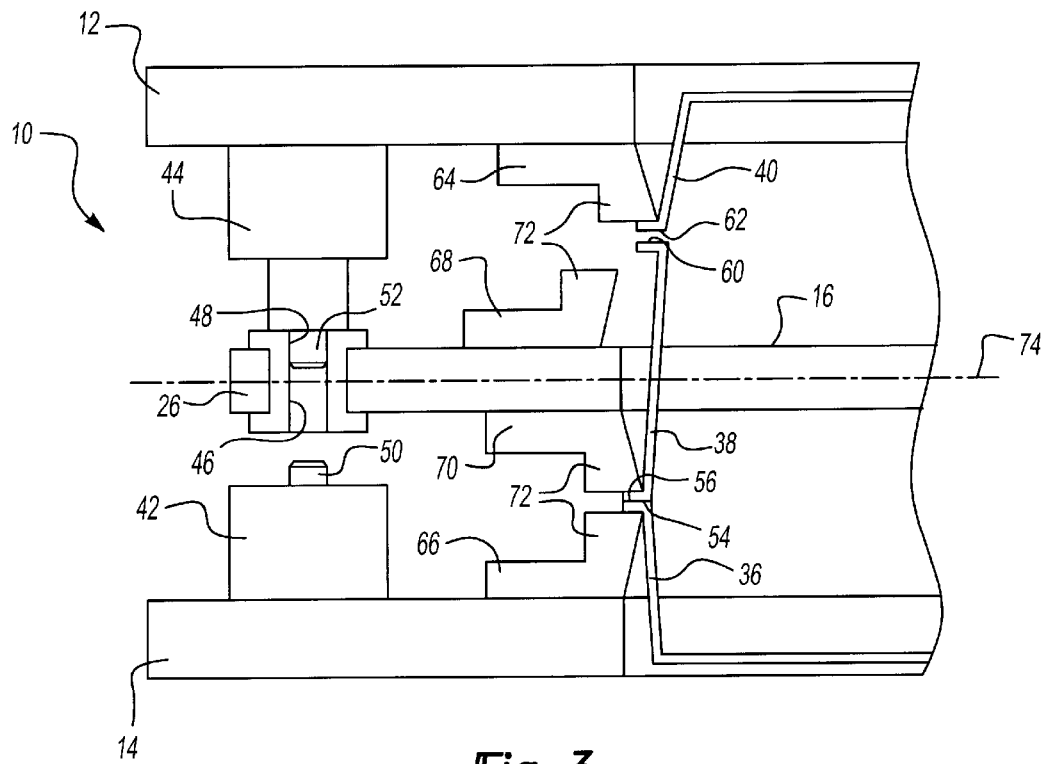
FIG. 3 is the vibration weld fixture assembly of FIG. 2 at a position for performance of a first vibration weld operation.

Once all of the pieces 36, 38, 40 have been loaded, the center tool 16 is moved to a desired location and a first vibration weld operation is performed, see FIG. 3. The actuator assembly 18 that is used to move the center tool 16 back and forth between the upper 12 and lower 14 tools can be any actuator assembly known in the art. Preferably, a linear actuator assembly includes a first screw jack 42 is mounted to the lower tool 14 and a second screw jack 44 is mounted to the upper tool 12 to move the center tool 16 along a linear path between the upper 12 and lower 14 tools.

As discussed above, an adaptor 26 is mounted to one end of the center tool 16 for selective engagement with the actuator assembly 18. The adaptor 26 includes a lower recess 46 and an opposing upper recess 48. The first screw jack 42 includes a first extendible member 50 that is selectively received within the lower recess 46 to move the center tool 16 back and forth along a linear path. The second screw jack 44 includes a second extendible member 52 that is selectively received within the upper recess 48 to move the center tool 16 back and forth along a linear path. The screw jacks 42, 44 are used to transfer welding loads and oscillation to the component pieces 36, 38, 40.

As shown in FIG. 3, the weld fixture assembly 10 is closed, the first screw jack 42 is retracted and the second screw jack 44 is engaged to lock the center tool 16 to the upper tool 12. This configuration develops the predetermined welding clamp forces across weld face 54 of the lower piece 36 and weld face 56 of middle piece 38. Because the center tool 16 is secured by the screw jack 44 mounted to the upper tool 12, the upper platen oscillation is developed across weld faces 54, 56 to complete the first vibration weld between the lower 36 and middle 38 pieces to form a sub-assembly.

Figure 4:
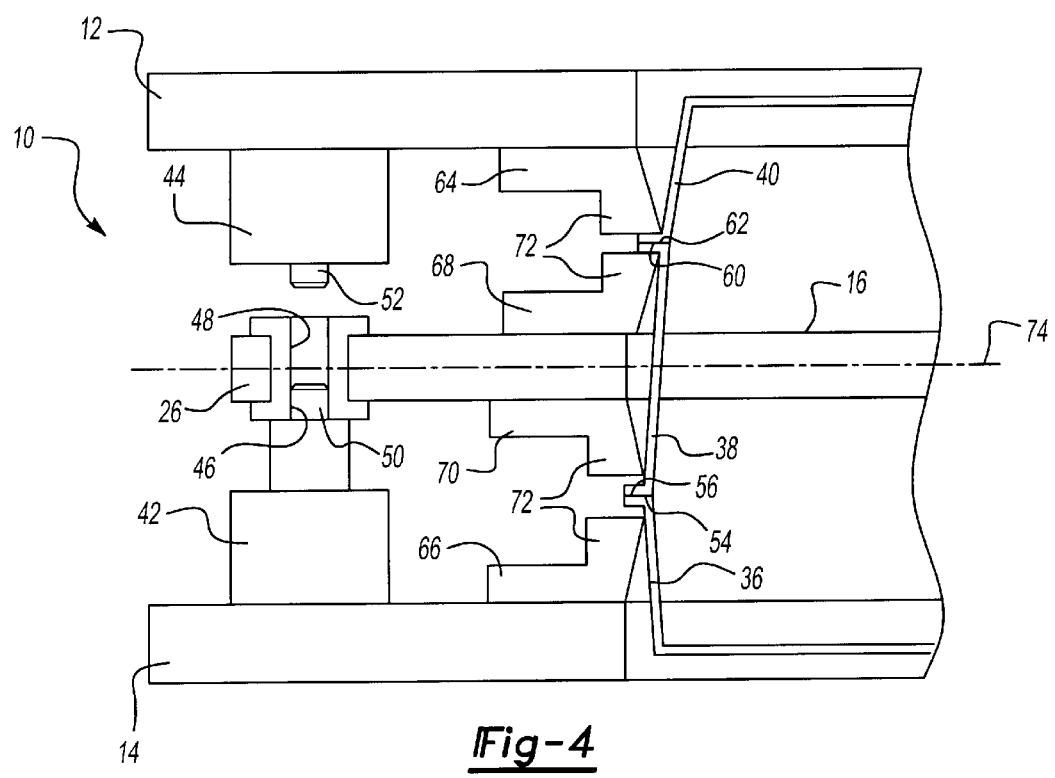
FIG. 4 is the vibration weld fixture assembly of FIG. 3 at a position for performance of a second vibration weld operation.

FIG. 4 shows the weld fixture assembly 10 closed and positioned to perform the second vibration weld. The second screw jack 44 is retracted and the first screw jack 42 is engaged to lock the center tool 16 to the lower tool 14. This develops the predetermined welding clamp forces across weld face 60 of middle piece 38 and weld face 62 of the upper piece 40. Because the center tool 16 is secured by the first screw jack 42 mounted to the lower tool 14, the upper platen oscillation is now developed across weld faces 60, 62 to complete the second vibration weld between middle 38 and upper 40 pieces to form a final assembly of all three pieces 36, 38, 40.

The lower tool 14 and center tool 16, depending upon component size, weight, undercut conditions etc., may require slides, shot pins or cam slide lock units (not shown) to accurately locate and securely hold the lower 36 and middle 38 pieces. Further, the weight of the center tool 16 should be controlled to keep the weight within the vibration weld machine parameters. Preferably, the upper tool 12 will not require any slide actions to locate the upper piece 40, however, it could be necessary to apply a vacuum to the upper piece 40 to hold the piece 40 in proper position.

As shown in FIGS. 3 and 4, the upper 12, lower 14, and center 16 tools include clamping portions. The upper tool 12 includes a first clamping portion 64, the lower tool 14 includes a second clamping portion 66, and the center tool 16 includes an upper clamping portion 68 and a lower clamping portion 70. Each clamping portions 64, 66, 68, 70 includes a leg portion 72 that extends transversely relative to a longitudinal axis 74 defined by the center tool 16. The weld faces 54, 56 are clamped between the second clamping portion 66 and the lower clamping portion 70 during the first vibration weld operation, and the weld faces 60, 62 are clamped between the first clamping portion 64 and the upper clamping portion 68 during the second vibration weld operation.

The method for welding the three-piece component in a single weld fixture assembly 10 includes the following machine and operator steps. The operator loads the lower 36 and middle 38 pieces to the lower tool 14 and loads the upper piece 40 to the upper tool 12. The operator activates the welding machine by pushing a button, lever, or other similar mechanism (not shown). A machine door (not shown) closes and air pressure is removed from the cylinder(s) 34, which allows the center tool 16 to drop onto the lower and middle weld faces 54, 56. If there are any undercut conditions at the lower and middle weld faces 54, 56 then slides, shot pins or cam slide locks advance to fully locate and clamp the lower and middle weld faces 54, 56 and prevent any side-to-side movement during the weld cycle.

As the vibration weld machine close, the upper and lower platens, the upper screw jack 44 engages to lock the center tool 16 to the top tool 12 and thus, transfer the clamp load and welding oscillation to weld faces 54, 56 to complete the lower piece 36 to middle piece 38 vibration weld.

Next, the vibration weld machine clamp load is relaxed and the upper screw jack 44 retracts and the lower screw jack 42 engages to lock the center tool 16 to the lower tool 14. This allows the transfer of clamp load and welding oscillation to weld faces 60, 62 to complete the middle piece 38 to upper piece 40 vibration weld.

Once both welds have been consecutively completed, the platens return to start position, and any slides, pins, or cams retract to their original positions. The cylinders(s) 34 lift the center tool 16 clear of the lower tool 14 and the operator can then remove the final assembly.

The subject invention allows vibration welding of three (3) separate plastic pieces with one (1) vibration weld fixture assembly. Two separate vibration welding operations are performed within the same weld fixture assembly to join the three pieces together. The unique weld fixture assembly utilizes a center plate/tool positioned between upper and lower plates/tools such that two (2) vibration weld operations can be performed by the same welding machine with only a minor increase in cycle time over a standard single vibration weld operation. Further each vibration weld operation utilizes completely different weld programs. This is a direct result of the weight of the upper toll change with the clamping of the center plate to the upper of lower tool. Clamp pressures change due to characteristics such as weld area differences and the upper tool weight change. These variable characteristics require change to the tuning frequency of the upper platen, which can easily be controller from the machine operation program.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A weld fixture assembly comprising:

an upper tool for supporting a first part;

a lower tool spaced apart from said upper tool for supporting a second part; and a center tool positioned between said upper and lower tools wherein said center tool is selectively movable relative to said upper and lower tools to bring a third part into engagement with at least one of said first or second parts for a welding operation.

2. An assembly as set forth in claim 1 wherein said upper and lower tools are held fixed.

3. An assembly as set forth in claim 1 including an actuator assembly for moving said center tool between said upper and lower tools.

4. An assembly as set forth in claim 3 wherein said actuator assembly moves said center tool along a linear path.

5. An assembly as set forth in claim 4 wherein said actuator assembly includes a first linear actuator mounted to said lower tool and a second linear actuator mounted to said upper tool wherein said first linear actuator selectively engages said center tool to move said center tool along a first linear path and said second linear actuator selectively engages said center tool to move said center tool along a second linear path.

6. An assembly as set forth in claim 5 wherein said first and second linear actuators comprise first and second screw jacks.

7. An assembly as set forth in claim 4 including an adapter mounted on said center tool for receiving an extendible portion of said actuator assembly.

8. An assembly as set forth in claim 1 wherein said lower tool includes a first clamping portion, said upper tool includes a second clamping portion, and said center tool includes a lower clamping portion positioned opposite from said first clamping portion and an upper clamping portion positioned opposite from said second clamping portion; and wherein said third part is initially clamped to one of said first part between said upper and second clamping portions or said second part between said lower and first clamping portions for a first weld operation to form a first subassembly; said center tool being movable to subsequently clamp the subassembly to said other of said first part between said upper and second clamping portions or said second part between said lower and first clamping portions for a second weld operation to form a final three-part assembly.

9. A weld fixture assembly comprising:

a fixed upper tool for supporting a first part;

a fixed lower tool spaced apart from said fixed upper tool for supporting a second part;

a center tool positioned between and movable relative to said upper and lower tools;

a linear actuator assembly including at least one extendible member for selectively engaging said center tool to bring a third part into engagement with at least one of said first or second parts for a vibration welding operation; and a controller for generating and transmitting a control signal to said linear actuator assembly to move said center tool to a predetermined weld position between said upper and lower tools for performing the vibration welding operation.

10. An assembly as set forth in claim 9 wherein said linear actuator assembly includes a first screw jack mounted to said upper tool with a first extendible member selectively engaging said center tool to move said center tool along a first linear path and a second screw jack mounted to said lower tool with a second extendible member selectively engaging said center tool to move said center tool along a second linear path.

11. An assembly as set forth in claim 10 including an adaptor mounted to one end of said center tool, said adaptor having a first recess for receiving said first extendible member and a second recess for receiving said second extendible member.

12. An assembly as set forth in claim 9 wherein said lower tool includes a first clamping portion, said upper tool includes a second clamping portion, and said center tool includes a lower clamping portion positioned opposite from said first clamping portion and an upper clamping portion positioned opposite from said second clamping portion, said second and third parts being selectively clamped together between said first and lower clamping portions for a first vibration weld and said first and third parts being selectively clamped together between said second and upper clamping portions for a second vibration weld.

13. An assembly as set forth in claim 12 wherein said first and second vibration welds are consecutively formed.

14. An assembly as set forth in claim 12 wherein said first, second, upper, and lower clamping portions each include a leg portion extending transversely relative to a longitudinal axis defined by said center tool.

15. Method of vibration welding a three-piece component within a single vibration weld fixture assembly including an upper tool, a lower tool, and a center tool positioned between the upper and lower tools comprising the steps of:

(a) loading a first component piece into the lower tool;

(b) loading a second component piece into the upper tool;

(c) moving a third component piece into engagement with one of the first or second component pieces via the middle tool; and (d) performing a first vibration weld.

16. A method as set forth in claim 15 further including the steps of:

(e) moving the third component piece into engagement with the other of the first or second component pieces via the middle tool; and (f) performing a second vibration weld.

17. A method as set forth in claim 16 wherein step (c) further includes using a first linear actuator to move the center tool along a first linear path.

18. A method as set forth in claim 17 wherein step (e) further includes using a second linear actuator to move the center tool along a second linear path such that the first a second vibration welds are consecutively formed.

19. A method as set forth in claim 18 further including the steps of clamping the first and third component pieces between the lower and middle tools with a first set of clamping portions at a first predetermined clamp pressure and clamping the second and third component pieces between the upper and middle tools with a second set of clamping portions at a second predetermined clamp pressure.

20. A method as set forth in claim 19 further including the step of generating a control signal to provide variable clamp pressures for said first and second predetermined clamp pressures based upon predetermined characteristics.

* * * * *